Oct. 9, 1962 — G. G. GREULICH — 3,057,272
MACHINE WELDED METAL GRATING

Filed Sept. 5, 1958 — 2 Sheets-Sheet 1

INVENTOR.
GERALD G. GREULICH
BY
Brown, Critchlow, Flick & Peckham
His Attorneys

Oct. 9, 1962  G. G. GREULICH  3,057,272
MACHINE WELDED METAL GRATING
Filed Sept. 5, 1958  2 Sheets-Sheet 2
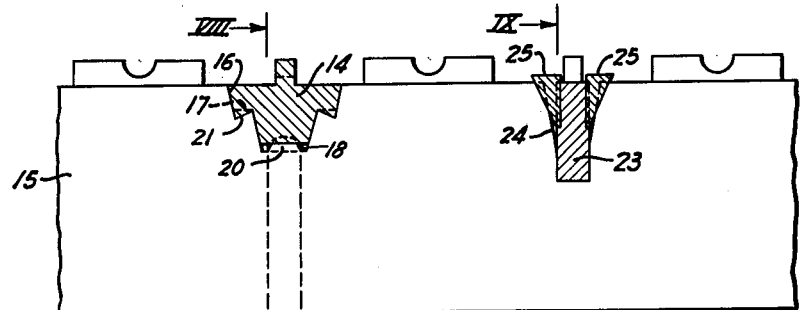
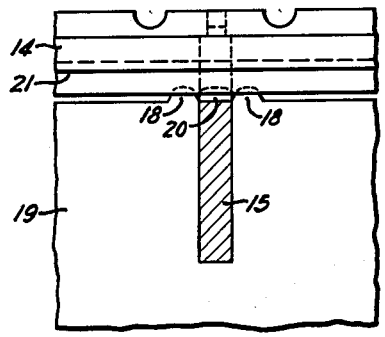
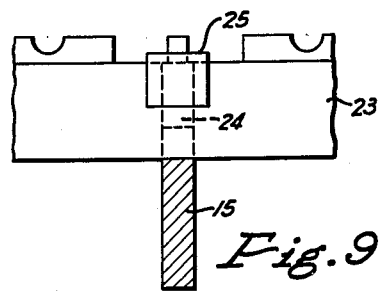
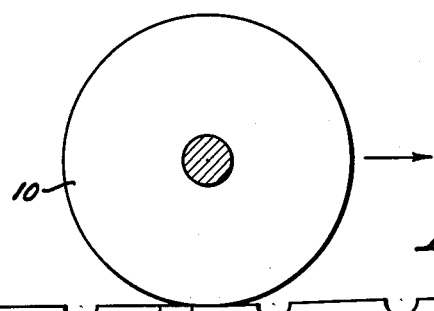
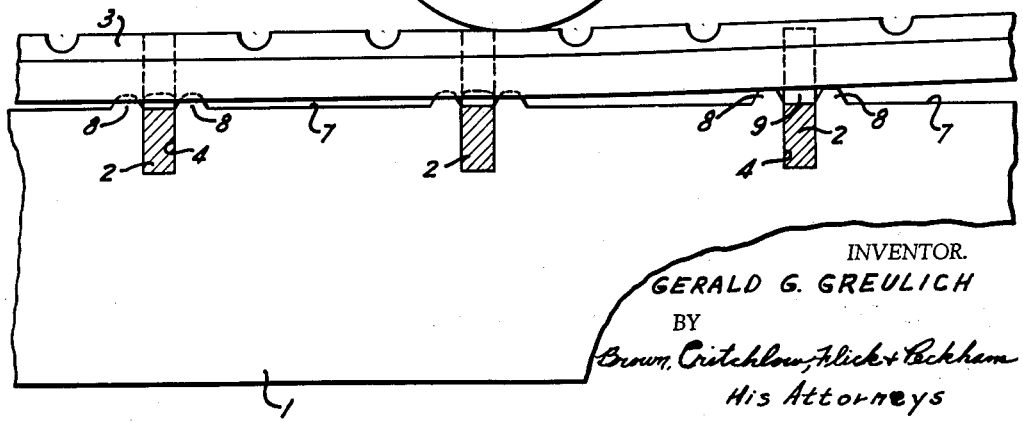
INVENTOR.
GERALD G. GREULICH
BY
Brown, Critchlow, Flick & Peckham
His Attorneys

United States Patent Office 3,057,272
Patented Oct. 9, 1962

3,057,272
MACHINE WELDED METAL GRATING
Gerald G. Greulich, 3018 NE. 20th Court,
Fort Lauderdale, Fla.
Filed Sept. 5, 1958, Ser. No. 759,248
3 Claims. (Cl. 94—30)

This invention relates to metal grating, and more particularly to such grating which can be welded automatically by machinery rather than by hand.

In the making of welded metal grating, it has been proposed to form the top flanges of the bearer bars on beams as separate elements and then weld them to the underlying portions of the beams after the cross bars have been inserted in the beam slots. The top flanges or bars would thus lock the cross bars in place. One of the reasons for attempting to make grating in such a manner was the hope that it could be machine welded by rolling a welding electrode along the top bars to pressure weld them throughout their length to the underlying beams. It did not work out satisfactorily, however, because very heavy electric current had to be used, which made control difficult, and also because each top bar or flange acquired a series of vertical waves. The waves or undulations resulted from the fact that in practice the top bar and the beam would overheat at intervals and soften too much at those points. The roller electrode on a welding machine naturally presses down further where the metal is softer and rides up where it is harder. It was found impossible to maintain the top bars straight when welded to the beams.

It is among the objects of this invention to provide metal grating in which the various members are pressure welded together, in which the welding can be done rapidly by a machine, and in which the top bars remain substantially straight after welding.

In accordance with this invention, a number of parallel upright horizontal beams are provided with downwardly extending slots. Cross bars are placed in the slots and project above the beams. The projecting portions of the cross bars are provided with notches located above the slots. A top bar extends through the notches along the top of each beam, with its lower surface opposed to the upper surface of the beam. One of these surfaces is provided with long shallow recesses between the cross bars in order to leave narrow vertical projections at the slots engaging the other surface. The top bars and beams are pressure welded together at the projections. For best results, the notches in the cross bars are provided with projections, to which the top bars are pressure welded also. There may be a projection at the bottom of each notch and further projections at their side walls.

The invention is illustrated in the accompanying drawings; in which

FIG. 6 is a section through cross bars, showing a top bar in the process of being welded to a beam;

FIG. 7 is a fragmentary section through a modified grate; and

FIGS. 8 and 9 are sectional details taken on the lines VIII—VIII and IX—IX, respectively, of FIG. 7.

Figure 3:
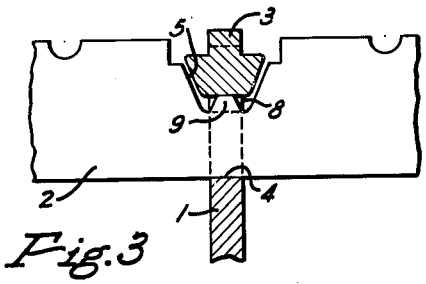
FIG. 3 is a vertical section taken on the line III—III of FIG. 2.

Referring to FIGS. 1 to 6 of the drawings, a metal grating is formed principally from three different types of elements; beams 1, cross bars 2, and top bars 3, all pressure welded together. The beams may take various forms, such as flat bearer bars or bars with bottom flanges, but in case they are disposed in parallel relation in upright position, which means that they stand on edge. The top of each beam does not have a flange, but it is provided at regular intervals with downwardly extending slots 4. Each slot in a beam is aligned with slots in the beams beside it. The cross bars 2 are inserted in the rows of aligned slots and project above the beams. Preferably, no more than about half of each bar extends above the beams. Above each beam the cross bars are provided with tapered notches 5 that extend down to the top of the beam.

Figure 2:
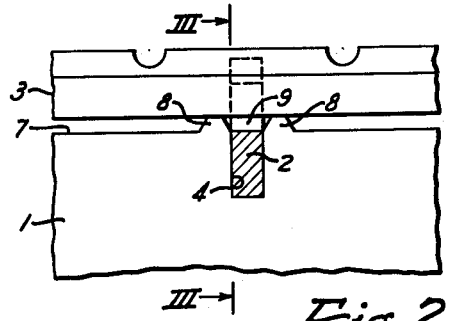
FIG. 2 is a vertical section through a cross bar showing a beam and top bar ready to be welded together.
Figure 5:
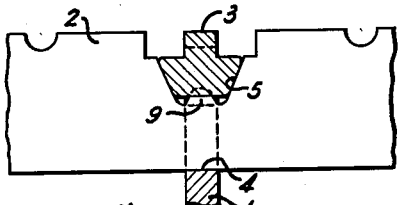
FIGS. 4 and 5 are views similar to FIGS. 2 and 3, but showing the members welded together.
Figure 4:
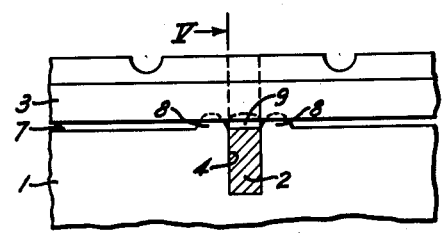
Figure 1:
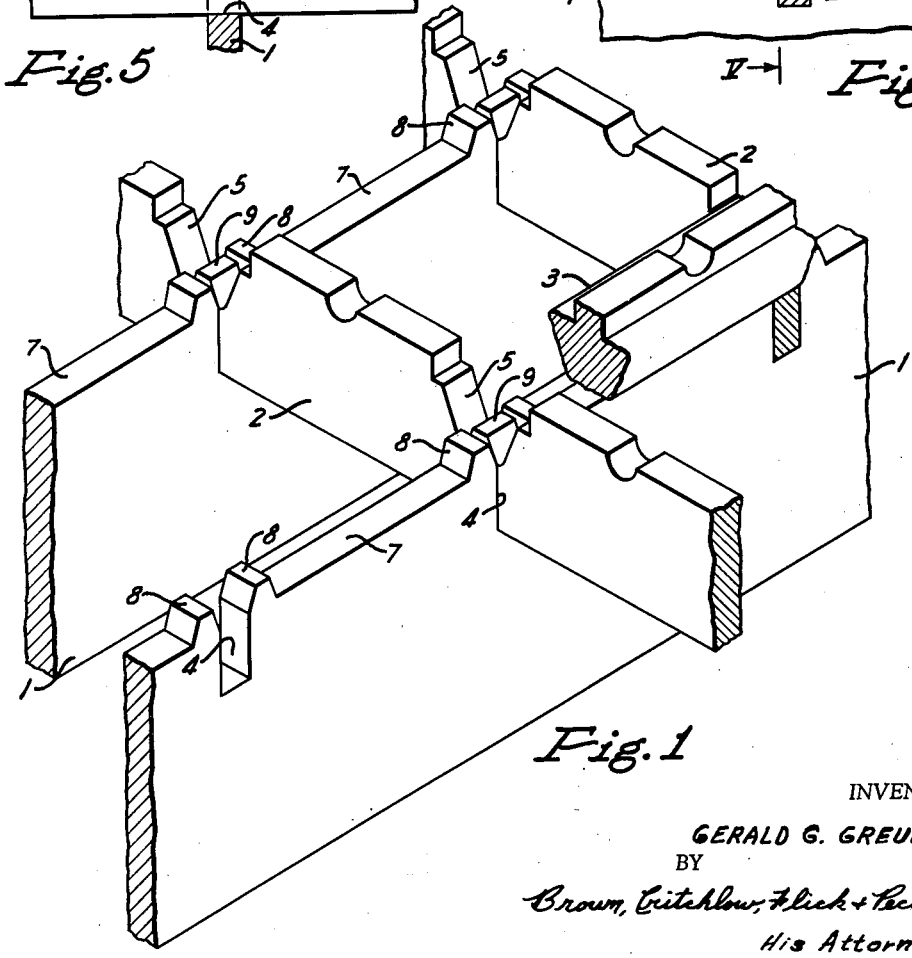
FIG. 1 is a fragmentary perspective view of metal grating, showing the beams and cross bars assembled and a top bar ready to be welded in place.

A heavy top bar 3 is laid along the top of each beam and through the cross bar notches above that beam. The lower surface of each top bar is substantially parallel to the upper surface of the underlying beam. One of these surfaces, preferably the upper surface of the beam, is provided between the cross bars with long shallow recesses 7 that leave narrow vertical projections 8 beside slots 4 and the cross bars. The top bar rests on these projections initially, as shown in FIGS. 2 and 3. It also is desirable to provide the bottom of each cross bar notch with an upward projection 9. The top of such projections should be at about the same level as the beam projections 8.

After the elements of the grating have been assembled in the manner just described, they are pressure welded together by moving an electrode 10 (FIG. 6) of an electric welding machine (not shown) lengthwise along the top of each top bar from one end to the other. Of course, the beam 1 is connected in the welding circuit. When the welding electrode reaches the area of the top bar above the first beam projection 8, the electric current flowing between that bar and beam is concentrated at the projection. The projection and the adjoining metal of the top bar are softened so that the top bar will be pushed down closer to the beam and be welded to the projection. The projection will be squashed down some, but generally will also push up into the top bar. As the electrode continues to travel forward, pressure welding will also occur in the same manner between the top bar and the cross bar projection 9 in notch 5. Then the top bar will be welded to the beam projection 8 at the opposite side of slot 4. The portion of the cross bar ahead of the weld will always be at a higher elevation, because it will rest on the next projection 8 that has not yet been heated by the welding current. However, when a weld is made at the next cross bar, the top bar will then be pressed down at that point also. Although it will have to bend down slightly at the edge of the weld previously made, that will occur without creating an objectionable wave in the top bar. When my welding is finished, the top bars are straight, their tops should be substantially flush with the tops of the cross bars, and all members should be securely welded together. Generally, a small space will remain between the top bars and beams in the recessed areas 7 of the latter.

In the modification shown in FIGS. 7, 8 and 9, still more secure connection is made between the top bars 14 and the cross bars 15 by providing the side walls of the cross bar notches 16 with projections 17, to which the sides of the top bars are welded when the bottoms of those bars are welded to projections 18 of the beams 19 and to projections 20 at the bottom of notches 16. Projections 17 preferably take the form of steps that are overlain by shoulders 21 extending longitudinally of the opposite sides of the top bars. The lower surfaces of these shoulders preferably are inclined downward and outward so that line contact is made initially between their outer edges and the top of the steps. This concentrates the electric current at those points and promotes softening and fusion. When the cross bars are pressed down during pressure welding, the top bar shoulders are forced into the softened steps and welded to them.

FIGS. 7 and 9 also illustrate how tertiary bars 23 can be machine welded to the cross bars 15 between the beams. The cross bars are provided with vertical notches 24 that receive the tertiary bars and have flaring upper portions. In the triangular spaced thus formed between the sides of a tertiary bar and the inclined sides of a notch 24, wedges 25 are placed. A roller electrode will press the wedges down and weld them to the adjoining members, whereby bars 23 will be welded in place.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine welded metal grating, comprising a plurality of parallel upright horizontal beams provided at the top with downwardly extending slots, parallel cross bars extending through said slots and projecting upwardly above the beams, the upwardly projecting portions of the cross bars being provided at the slots with downwardly extending notches, and a substantially straight top bar extending along the top of each beam through said notches, the tops of the beams having narrow vertical projections beside the slots and spacing the top bars from the tops of the beams, and the top bars being pressure welded to the beams at said projections and to the cross bars in said notches.

2. A machine welded metal grating, comprising a plurality of parallel upright horizontal beams provided at the top with downwardly extending slots, parallel cross bars extending through said slots and projecting upwardly above the beams, the upwardly projecting portions of the cross bars being provided at the slots with downwardly extending notches, and a substantially straight top bar extending along the top of each beam through said notches, the tops of the beams having narrow vertical projections one close to each side of each slot and spacing the top bars from the tops of the beams, the top bars and beams being pressure welded together at said projections, and the bottom of each cross bar notch being spaced from the overlying top bar and having a vertical projection pressure welded to that top bar.

3. A machine welded metal grating, comprising a plurality of parallel upright horizontal beams provided at the top with downwardly extending slots, parallel cross bars extending through said slots and projecting upwardly above the beams, the upwardly projecting portions of the cross bars being provided at the slots with downwardly extending notches having side walls provided with steps, and a substantially straight top bar extending along the top of each beam through said notches and having longitudinal shoulders overlying said steps in engagement therewith, the tops of the beams having narrow vertical projections beside the slots and spacing the top bars from the tops of the beams, the top bars being pressure welded to the beams at said projections, and said shoulders being pressure welded to the cross bars at said steps.

References Cited in the file of this patent

UNITED STATES PATENTS

| | | |
|---|---|---|
| 1,736,539 | Lachman | Nov. 19, 1929 |
| 1,867,701 | Keown | July 19, 1932 |
| 1,977,299 | Bates | Oct. 16, 1934 |
| 2,469,070 | Greulich | May 3, 1949 |
| 2,740,335 | Greulich | Apr. 3, 1956 |
| 2,747,474 | Nagin | May 29, 1956 |
| 2,767,627 | Lynn | Oct. 23, 1956 |
| 2,782,696 | Francis et al. | Feb. 26, 1957 |
| 2,834,267 | Beebe | May 13, 1958 |